Jan. 16, 1968         E. P. BULLWINKEL         3,364,421
METHOD AND APPARATUS FOR ASSAYING DIELECTRIC PROPERTIES
OF A PAPER WEB BY MEANS OF APPLIED VOLTAGE PULSES
Filed June 29, 1966         3 Sheets-Sheet 1

INVENTOR.
EDWARD P. BULLWINKEL

BY

Breitenfeld & Levine
ATTORNEYS

INVENTOR.
EDWARD P. BULLWINKEL

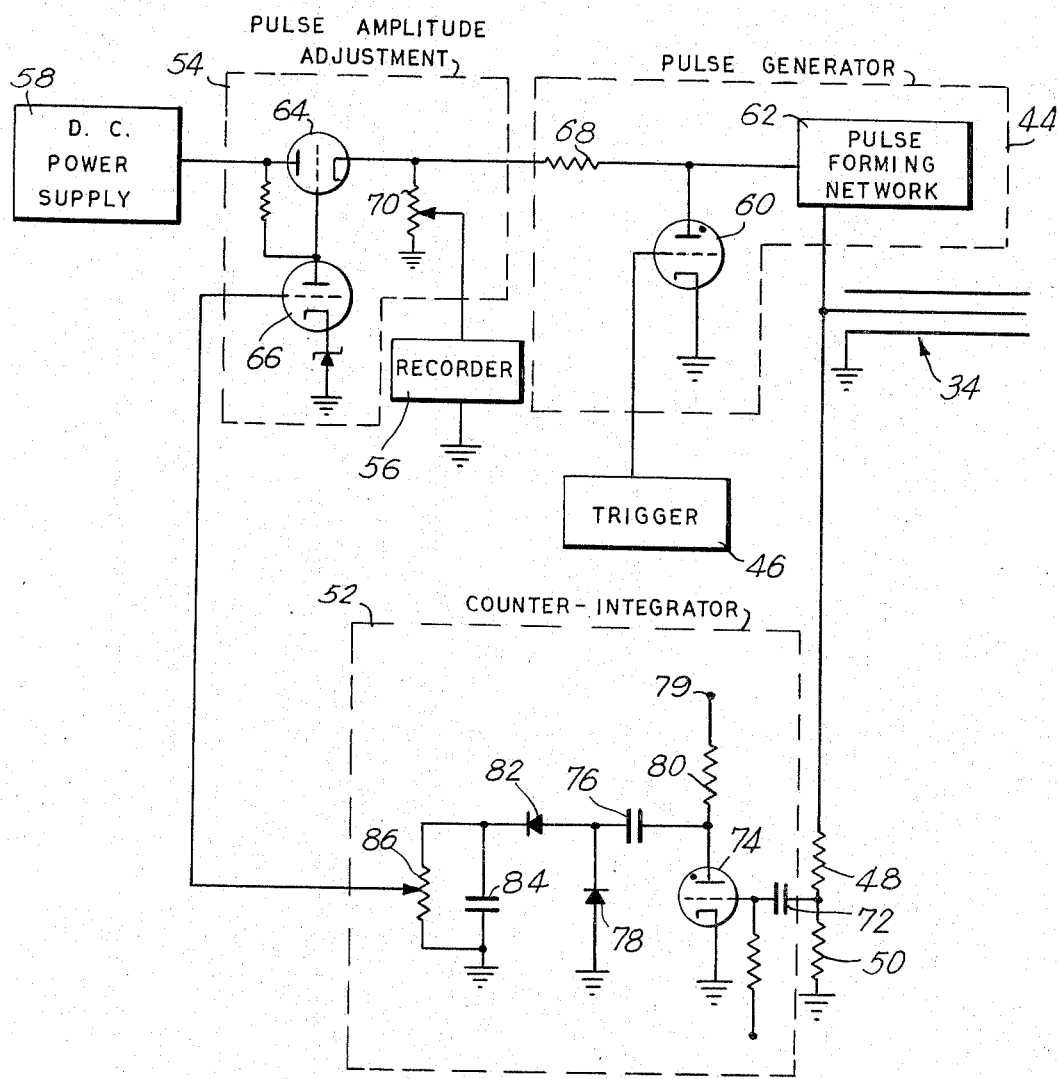

United States Patent Office 3,364,421
Patented Jan. 16, 1968

3,364,421
METHOD AND APPARATUS FOR ASSAYING
DIELECTRIC PROPERTIES OF A PAPER WEB
BY MEANS OF APPLIED VOLTAGE PULSES
Edward P. Bullwinkel, Stockbridge, Mass., assignor to
Kimberly-Clark Corporation, Neenah, Wis., a corporation of Delaware
Filed June 29, 1966, Ser. No. 561,612
4 Claims. (Cl. 324—54)

ABSTRACT OF THE DISCLOSURE

Moving web passes between two electrodes. Series of voltage pulses transmitted to one electrode via a cable which terminates at its electrode end in an impedance equal to its characteristic impedance. Pulses reflected upon breakdown of web are counted. Reflected pulses may be integrated, and output signal of integrator used to control amplitude of voltage pulses, measurement of this amplitude yielding indication of minimum dielectric strength of the web.

---

This invention relates generally to the manufacture of paper, and in particular to an apparatus and a method for assaying the dielectric strength of a web of paper during the uninterrupted manufacture of the web.

The invention is primarily intended for use in a manufacturing installation in which a continuous process of making paper involves the gradual dehydration of a web from an initially wet state. While this invention is of particular value for use in assaying the dielectric qualities of capacitor paper, its applicability is not limited to this specific use.

In known methods and apparatus for measuring the voltage breakdown characteristics of a paper web in which the quality of the tissue being manufactured is continuously monitored, a fixed voltage is applied transversely through the web. When this applied voltage exceeds the breakdown level of the web, a voltage pulse is produced at the moment of breakdown which can readily be detected. These pulses may be counted and recorded by means of well known electronic apparatus. However, despite the fact that a constant amplitude D.C. voltage is applied to the electrode in contact with the web, the motion of the web results in a slowly rising ramp voltage applied to each portion of the paper web as it approaches the electrode. It has been found that because of this ramp voltage, the breakdown voltage observed is a function of the moisture content of the web. Consequently, the known methods for monitoring the dielectric strength of a paper web require that the moisture of the web be very carefully controlled so that the results obtained are meaningful. In the actual practice of manufacturing such webs, the moisture control required for accurate measurements is achieved only at great difficulty and expense.

In order to overcome the difficulty outlined above, it is an object of this invention to provide a method and apparatus, for continuously assaying the electrical properties of a paper web during its manufacture, which are insensitive to the moisture content of the web being monitored.

It has been found that the above objective can be achieved by a test procedure which involves applying voltage pulses of extremely short duration transversely through the newly-formed moving web. The reason that testing by means of short duration pulses yields results which are independent of moisture content, whereas conventional testing by constantly applied voltages is affected by moisture, is believed to reside in the fact that moisture increases the conductivity of the paper web so that appreciable $I^2R$ heating occurs. If a test voltage is applied constantly, this heating increases the temperature of the paper causing an increase in its conductivity, which in turn increases the rate of heating still further. This sequence continues until terminated by a failure of the dielectric known as "thermal breakdown." However, if a test voltage is applied for only an instant and then removed, the paper being tested is not heated to any great extent and hence it does not fail by the thermal breakdown mechanism. Nevertheless, it has been found that a paper dielectric can be broken down by a very short duration voltage pulse if the voltage value of the pulse is sufficiently high. Furthermore, the "critical" voltage at which the paper breaks down under such a voltage pulse is independent of the moisture content of the paper.

According to the present invention, one of a pair of electrodes which are continuously in contact with the paper web is supplied with a series of short duration voltage pulses.

The voltage pulses are transmitted to the electrode through a transmission line, such as a coaxial cable, which couples the pulse generator to the electrode. The cable is terminated in its characteristic impedance, so that when the consistency or thickness of the web is sufficient to prevent breakdown, the pulses are completely absorbed. If the level of the voltage pulse is sufficient to cause a breakdown in the web, an effective short circuit will appear at the electrode end of the cable, resulting in the pulse being reflected back along the cable in an inverted form. This reflected pulse, which is of opposite polarity to the transmitted pulse, may be readily distinguished from the transmitted pulses and hence may easily be recorded and counted.

A feature of this invention is the provision of apparatus for automatically rendering an indication related to the minimum values of dielectric strength of the web by being sensitive to the level of voltage at which a predetermined percentage of the voltage pulses will cause breakdowns. This is of particular importance in the manufacture of capacitor paper as it is the voltage value producing an acceptable breakdown rate which determines the overall effectiveness of the paper as a capacitor dielectric. This is because breakdown generally occurs at the point of minimum dielectric strength of the paper. According to the present invention, an indication related to the minimum values of dielectric strength is achieved by integrating the breakdown pulses to produce a D.C. voltage which in turn is employed to vary the amplitude of the transmitted voltage pulses.

A further feature of this invention is the use of a single cable to transmit both the original and reflected pulses. This permits great simplicity in both the installation and operation of the paper monitoring and assaying apparatus.

Another feature of this invention is the elimination of electrode pitting due to the employment of short duration test pulses.

Further features of the present invention will be apparent from the following description in which reference is made to the accompanying drawings.

In the drawings:

FIG. 5 is a schematic diagram showing circuitry details of the system shown in FIG. 4.

Figure 1:
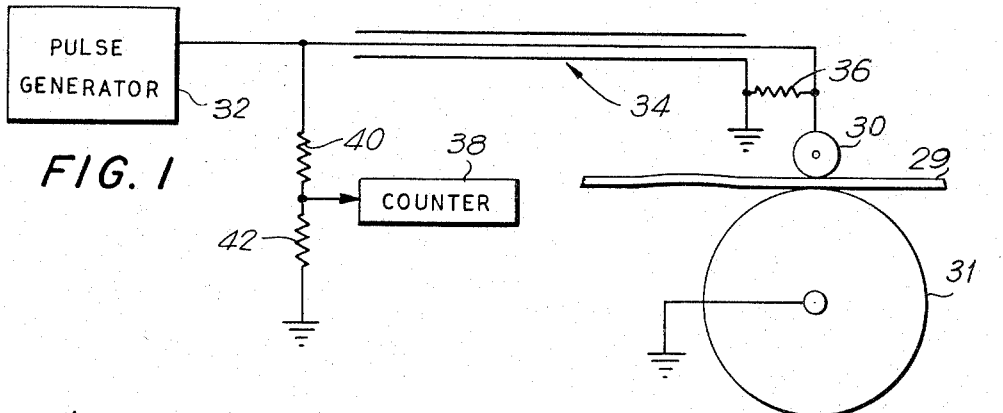
FIG. 1 is a simplified schematic representation of an apparatus according to the present invention.

Referring to FIG. 1, a web of newly-formed paper 29 is shown passing between a test electrode 30 and a grounded roller 31. The paper may be moving at a rate of approximately 300 feet per minute. During the continuous movement of web 29, electrode 30, which may be in the form of a roller, is in continuous contact with a longitudinal section of the web. A pulse generator 32, capable of producing a series of pulses at a set repetition rate, each pulse having a duration of approximately one-tenth of a micro-second, is connected to electrode 30 by means of a transmission line, such as a coaxial cable 34. To provide for maximum transmission of the pulses to the electrode 30, the output impedance of pulse generator 32 is made equal to the characteristic impedance ($Zo$) of the transmission line 34. At the electrode end of cable 34, a resistor 36, also having a resistance equal to the characteristic impedance ($Zo$) of the cable, is connected between the coaxial conductors of the cable 34.

Figure 2:
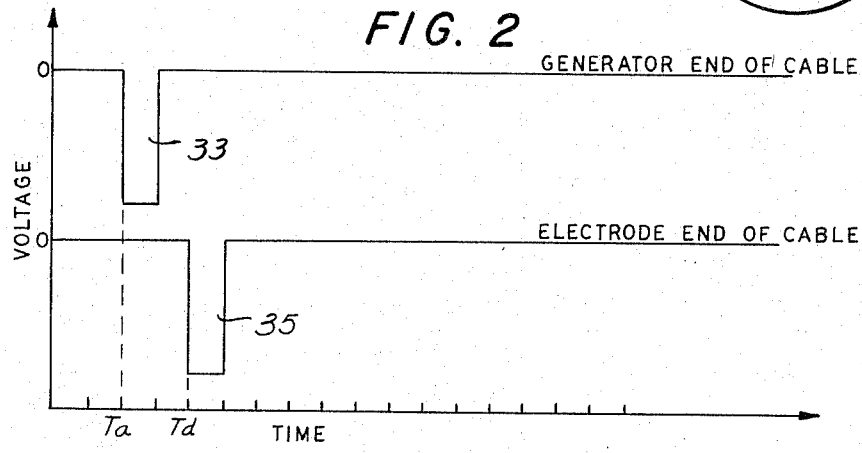
FIG. 2 is a voltage-time diagram illustrating the pulses at the generator and electrode end of the cable when no breakdown in the web occurs.

With reference now to FIG. 2, the pulse 33 produced by generator 32 at a time $Ta$ is transmitted by cable 34 toward electrode 30, and arrives at electrode 30 at a time $Td$, as illustrated at 35. The interval between time $Ta$ and time $Td$ represents the time delay experienced by the pulse as it travels along the cable 34 from the pulse generator 32 to the electrode 30. When voltage pulse 35 is insufficient to cause breakdown of web 29 at the point of contact of electrode 30, the energy of the transmitted pulse will be completely absorbed by resistor 36, since as mentioned above the value of resistor 36 equals the characteristic impedance of the cable.

Figure 3:
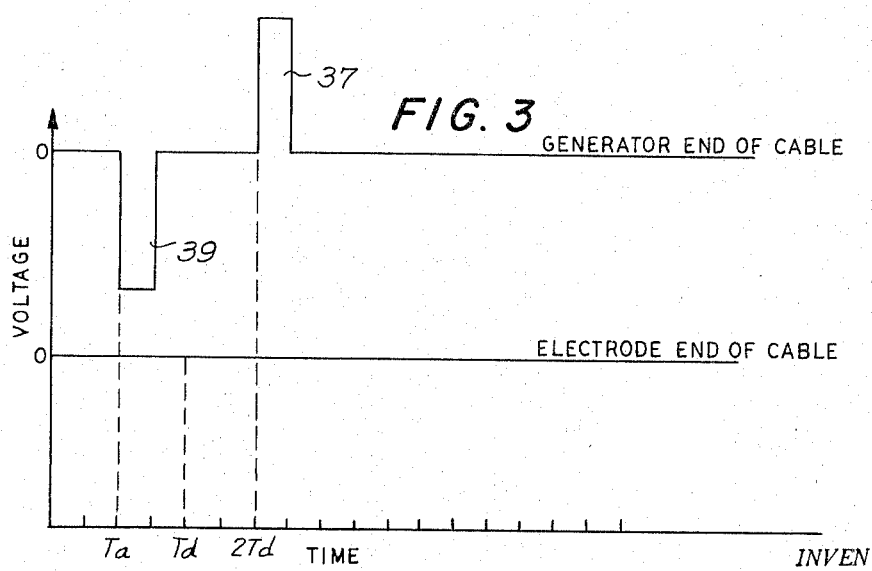
FIG. 3 is a voltage-time diagram illustrating the pulses at the generator and electrode end of the cable when breakdown in the web occurs.

The pulse diagram of FIG. 3 illustrates the condition when the amplitude of the test voltage is sufficient to break down web 29 at the point of test or contact. Upon breakdown of the web at time $Td$, the electrode end of cable 34 behaves substantially as a short circuit, and causes the transmitted pulse 39 to be reflected back along cable 34 toward the generator in an inverted form, as shown by pulse 37. Reflected pulse 37 appears at generator 32 at time $2Td$. The interval between time $Ta$, when the original pulse leaves the generator 32, and the time $2Td$ represents the total time required for the original pulse 39 to travel from the generator 32 to the electrode 30 and the reflected pulse to travel from the electrode 30 back to the generator 32. The reflected pulse 37 is of opposite polarity from the polarity of the original pulse 39. Thus, for example, if the original pulse 39 is a negative voltage pulse, the reflected pulse 37 will be a positive voltage pulse.

As may be seen in FIG. 1, the reflected positive pulse may be applied, along with the outgoing negative pulses, to a counter 38 through a voltage divider comprising resistors 40 and 42. Counter 38 is a pulse counter of the type well known in the art, which is able to detect the presence of a reflected positive pulse among all the original negative pulses, indicating that a breakdown of the web has occurred at the amplitude of the transmitted pulse. In a well known manner, the amplitude of the transmitted pulse may be observed, either at the generator, or by applying the transmitted pulse to an oscilloscope or similar measurement device.

FIG. 1 illustrates the simplest manner of utilizing the present invention to continuously assay the dielectric strength of a paper web. However, when the web is to be used as a dielectric in a capacitor, it is of special interest to obtain information regarding minimum values of the dielectric strength transversely through the web, i.e., to obtain a reading related to the voltage which, if applied across the opposed faces of the web, will cause a certain small percentage of breakdowns to occur in the web.

Figure 4:
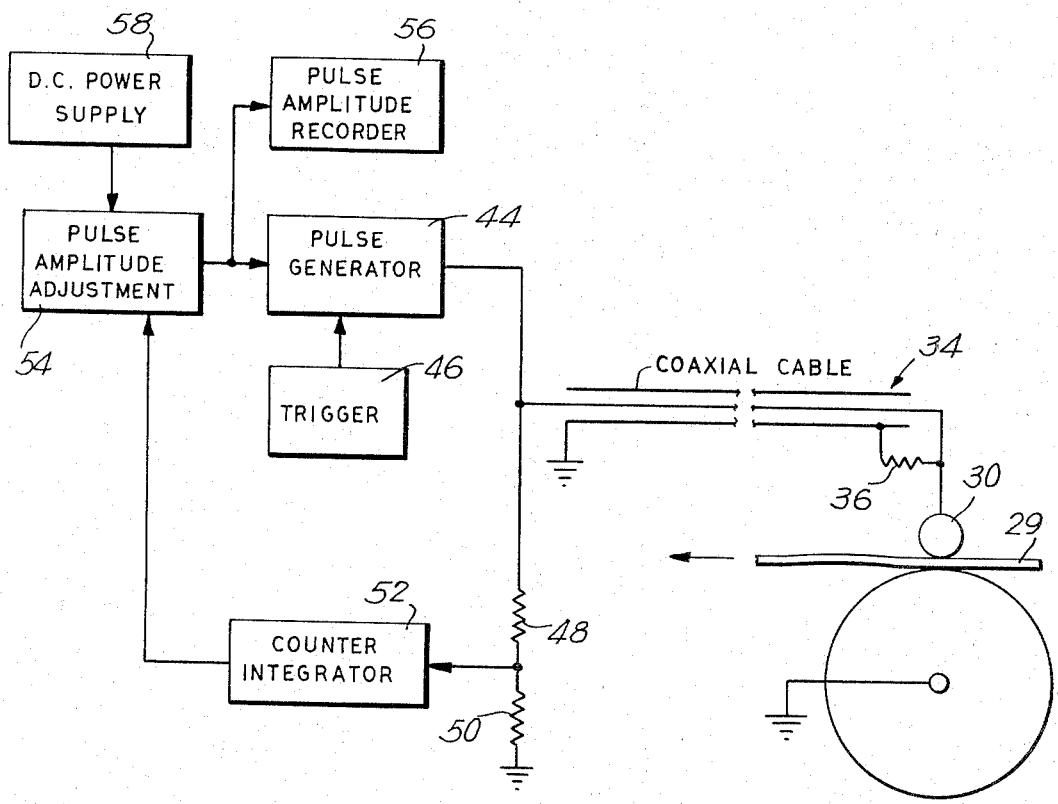
FIG. 4 is a block diagram illustrating a paper-assaying system according to this invention.

The apparatus of FIG. 4 illustrates an embodiment of the present invention in which this minimum value of dielectric strength may be automatically indicated. The pulse generator 44 is triggered at a fixed repetition rate by means of a trigger 46. Generator 44 may produce pulses of approximately .1 microsecond duration at a repetition rate of approximately one thousand pulses per second. As in the arrangement of FIG. 1, the output impedance of generator 44 is approximately equal to the characteristic impedance of coaxial cable 34, which couples the output of generator 44, to a test electrode 30. The cable 34 is terminated by a resistor 36 having a resistance equal to the characteristic impedance of the cable. When breakdown occurs in web 29 due to the application of the pulses transversely through the web, the reflected pulses produced are conducted, along with the original pulses, through a voltage divider, comprising resistors 48 and 50, into a counter-integrator 52. However, as mentioned above, the counter-integrator is activated only by the positive reflected pulses and not by the original negative pulses. The counter-integrator produces a D.C. voltage which is coupled to a pulse amplitude adjustment circuit 54, the latter circuit in turn producing a voltage proportional to the frequency of breakdown of the web. This voltage is coupled back to pulse generator 44 to vary the amplitude of the pulses generated by generator 44. The voltage produced by pulse amplitude adjustment circuit 54 is also coupled to a pulse amplitude recorder 56 which records this voltage as a measure of the paper quality, the measurement being related to the voltage which will produce a desired percentage of breakdowns of the web. The pulse amplitude adjustment circuit 54 is provided with power from a D.C. power supply 58.

The embodiment of FIG. 4 is shown in greater detail in the schematic of FIG. 5 which illustrates the components of the various circuits shown in FIG. 4. As these blocks are actually standard items in the electronic art, it will be understood that other circuit configurations may be employed to achieve the same results as those described herein. Pulse generator 44 comprises a pulse forming network 62, a charging resistor 68, and a hydrogen thyratron 60 which is controlled by a trigger 46. The pulse forming network 62 becomes charged via resistor 68 during the period between pulses, and the thyratron serves to connect the network 62 to ground to thus discharge the network and cause a pulse of the desired amplitude and duration to be applied to the electrode 30 via cable 34.

In operation, pulse forming network 62 is charged, between pulses, to a positive potential through a pulse amplitude control circuit comprising voltage regulators 64 and 66. During the pulsing period, impedance 68 actively isolates amplitude adjustment circuit 54 and pulse generator 44. A potentiometer 70 is located in the cathode circuit of voltage regulator 64, and a voltage proportional to the pulse amplitude across potentiometer 70 is conducted to a recorder 56 which, as mentioned above, provides an indication of the quality of the web being processed.

The counter-integrator circuit 52 receives the reflected pulse from a voltage divider comprising resistors 48 and 50. The reflected pulse is then coupled by a capacitor 72 to the grid of a thyratron 74. When thyratron 74 is switched into the conducting state by the incoming pulse, capacitor 76 is quickly discharged through diode 78 and thyratron 74. Thereafter, thyratron 74 returns to a non-conducting state and capacitor 76 slowly recharges back to a voltage, equal to the value of voltage supply 79 of the thyratron 74, at a rate determined by the time constant of capacitor 76 and resistor 80. The current during this period is conducted through resistor 80, capacitor 76, and diode 82, to charge relatively large capacitor 84 which is in parallel with a bleeding resistor 86. The circuit of capacitor 84 and resistor 86 serves as an integrating or smoothing circuit to produce an output voltage across resistor 86 proportional to the number of breakdown pulses across web 29 for a given period of time. This output voltage is conducted back to the grid of voltage regulator 66 and causes an increase in the plate current of regulator 66. This, in turn, tends to bias regulator 64 in the off condition and thereby lower the amplitude of the pulses produced by generator 44. Since the output voltage of the integrator circuit 52 increases as the fraction of pulses which produce breakdown of the web pulses exceeds a desired level, the decrease in the pulse amplitude will continue until only the desired proportion of test pulses produce breakdown. This level is therefore related to the maximum voltage level at which the paper tissue being manufactured can effectively operate as a dielectric. The operator in charge of the manufacturing of the paper can read this voltage on the recorder 56. If this recorded voltage indicates that the dielectric strength of the paper is below the value specified for use as a dielectric, the operator may either cease the paper-making operation or modify the process in some manner to increase the dielectric strength of the paper until the recorded voltage reaches a higher value. It can be seen that as the dielectric strength of the web increases there will be fewer breakdowns at the low voltage, thus causing the output voltage of the counter-integrator circuit 52 to decrease with a resultant increase of the pulse amplitude at generator 44. When the rate of breakdown is below the specified value, the process will be reversed in that the output of integrator 52 is decreased and the pulse amplitude is increased until the desired fraction of test pulses cause the web to break down.

The manner in which the present invention yields the desired information about dielectric strength of the paper being assayed will now be readily appreciated. Short voltage pulses are applied at a rapid rate, say one thousand pulses per second, to a moving web of paper. Because the pulses are of very short duration, say 0.1 microsecond or less, the web is effectively stationary for the duration of each pulse. Therefore, the effect in each second is comparable to moving the electrode to one thousand different positions on a stationary web and applying one test pulse at each position. Each of these tests has only two possible results; either the web breaks down or it does not. The device is capable of being set at a predetermined percentage of breakdowns and thereafter automatically adjusts the voltage of the test pulses so that this predetermined percentage of breakdowns is maintained.

Setting the device for a preselected percentage of breakdowns, i.e., a preselected ratio of pulses which produce breakdown of the web to the total number of original pulses, may be accomplished by first measuring the total output voltage of the counter with a volt meter whose reading has been previously calibrated to indicate counts per second. Assuming a 0.2% breakdown level is chosen, and the pulse repetition rate is one thousand per second, the potentiometer 86 is adjusted so that the meter reads two counts per second. If voltage regulators 66 and 64 have sufficient gain, the circuitry will thereafter automatically maintain the counts at this level over a very wide range of pulse voltages. Consequently, the adjustment of the potentiometer need be changed only when it is desired to alter the preselected percentage of breakdowns, and not when the quality or grade of the paper varies.

If the predetermined percentage of breakdowns is chosen to be small, say 0.1%, the recorded voltage at recorder 56 will be a sensitive function of the minimum dielectric strength of the web. The reason is that under such conditions, the test pulse is sufficient to break the paper down in only one of every one thousand test positions on the web. In contrast, if the percentage of breakdowns were set at a high value, say 99%, the recorded voltage would be more of a measure of the average dielectric properties of the web. Therefore, by adjusting the counter-voltage regulator loop to an equilibrium state which corresponds to a very low percentage of breakdowns, the device necessarily yields voltage readings that are related to the minimum dielectric strength of the web.

Only certain preferred embodiments of the invention have been shown, and it is evident that modification in details may be readily made thereto without departing from the scope of the invention which is expressed in the appended claims.

What is claimed is:

1. An apparatus for assaying the dielectric properties of a continuously moving web of paper during the course of its manufacture, comprising:
   a generator supplying a series of voltage pulses of short duration, the duration of said pulses and their rate being constant,
   a pair of electrodes in contact with opposite faces of the moving web,
   a transmission line connecting said pulse generator to one of said electrodes,
   an impedance connected to the electrode end of said transmission line, the value of said impedance being equal to the characteristic impedance of said transmission line, whereby when there is no electrical conduction between said electrodes said voltage pulses are completely absorbed, but when there is conduction through the web between said electrodes the respective voltage pulse is reflected back along the transmission line, and
   means for counting only said reflected pulses to indicate the frequency of breakdown of the web.

2. An apparatus as defined in claim 1 including means electrically connected to said counter for producing a signal whose value is proportional to the number of reflected pulses per unit time but insensitive to the amplitude of the reflected pulses, and means connected between said signal-producing means and said pulse generator for varying the amplitude of said voltage pulses in response to changes in value of said signal.

3. An apparatus as defined in claim 2 wherein said amplitude varying means reduces the amplitude of said voltage pulses when the value of said signal increases, and increases the amplitude of said voltage pulses when the value of said signal decreases, means associated with said signal-producing means for adjusting the value of said signal so that it corresponds to some preselected rate of reflected pulses and hence breakdowns of the web, and means for continuously indicating the amplitude of said voltage pulses to render an indication of the minimum dielectric strength of the web being tested.

4. A procedure for assaying properties of a continuously moving web of paper during the course of its manufacture, comprising the steps of:
   passing the web between two electrodes which contact the opposite faces of the web,
   transmitting a series of short duration voltage pulses to one of said electrodes, the duration of said pulses and their rate being constant,
   counting only those voltage pulses which are reflected due to production of breakdowns of the web,
   integrating said breakdown pulses to produce a signal whose value is proportional to the rate of said breakdown pulses,
   adjusting the amplitude of said voltage pulses to maintain the value of said signal constant, and
   recording the amplitude of said voltage pulses to render an indication of the minimum dielectric strength of the web.

References Cited

UNITED STATES PATENTS

| | | | |
|---|---|---|---|
| 2,890,409 | 6/1959 | Van Krevelen | 324—54 |
| 2,960,653 | 11/1960 | Linlor et al. | 324—61 |
| 2,978,636 | 4/1961 | Fountain | 324—54 |
| 3,243,701 | 3/1966 | Strand | 324—61 |

OTHER REFERENCES

Honnell: Location of Line Faults, Electronics, November 1944, pp. 110–113.

Halverson: Testing Microwave Transmission Lines, Electronics, June 30, 1961, pp. 86–88.

RUDOLPH V. ROLINEC, *Primary Examiner.*

G. STRECKER, *Assistant Examiner.*